US008483725B2

(12) United States Patent
Kim et al.

(10) Patent No.: US 8,483,725 B2
(45) Date of Patent: Jul. 9, 2013

(54) METHOD AND APPARATUS FOR DETERMINING LOCATION OF MOBILE DEVICE

(75) Inventors: Taesu Kim, Seoul (KR); Kisun You, Suwon (KR); Yong-Hui Lee, Seoul (KR); Te-Won Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/289,675

(22) Filed: Nov. 4, 2011

(65) Prior Publication Data

US 2012/0142378 A1 Jun. 7, 2012

Related U.S. Application Data

(60) Provisional application No. 61/419,683, filed on Dec. 3, 2010, provisional application No. 61/450,010, filed on Mar. 7, 2011, provisional application No. 61/485,574, filed on May 12, 2011.

(51) Int. Cl.
*H04W 4/02* (2009.01)

(52) U.S. Cl.
USPC ........................................ 455/456.6; 709/224

(58) Field of Classification Search
USPC .. 455/404.2, 414.1–414.4, 422.1, 456.1–457; 709/223–226
See application file for complete search history.

(56) References Cited

U.S. PATENT DOCUMENTS

| 5,918,223 A | 6/1999 | Blum et al. |
| 6,127,975 A | 10/2000 | Maloney |
| 6,912,178 B2 | 6/2005 | Chu et al. |
| 7,171,329 B2 | 1/2007 | Rodman et al. |
| 7,617,287 B2 | 11/2009 | Vella et al. |
| 7,675,414 B2 | 3/2010 | Ray |
| 7,746,226 B2 | 6/2010 | Cohen et al. |
| 2001/0022558 A1 | 9/2001 | Karr, Jr. et al. |
| 2004/0259536 A1 | 12/2004 | Keskar et al. |
| 2006/0046707 A1 | 3/2006 | Malamud et al. |

(Continued)

FOREIGN PATENT DOCUMENTS

| EP | 2317729 | 5/2011 |
| GB | 2445436 A | 7/2008 |
| WO | WO0248837 | 6/2002 |
| WO | WO2010125488 | 11/2010 |

OTHER PUBLICATIONS

Azizyan, et al., "SurroundSense: Localizing Mobile Phones Using Ambient Light, Sound, Color, and Motion", Duke University, 15 pages, No date given.

(Continued)

*Primary Examiner* — Kashif Siddiqui
(74) *Attorney, Agent, or Firm* — Toler Law Group, PC

(57) ABSTRACT

A method for determining a location of a mobile device with reference to locations of a plurality of reference devices is disclosed. The mobile device receives ambient sound and provides ambient sound information to a server. Each reference device receives ambient sound and provides ambient sound information to the server. The ambient sound information includes a sound signature extracted from the ambient sound. The server determines a degree of similarity of the ambient sound information between the mobile device and each of the plurality of reference devices. The server determines the location of the mobile device to be a location of a reference device having the greatest degree of similarity.

49 Claims, 13 Drawing Sheets

U.S. PATENT DOCUMENTS

| | | |
|---|---|---|
| 2007/0037583 A1 | 2/2007 | Kim et al. |
| 2007/0130580 A1 | 6/2007 | Covell et al. |
| 2008/0147461 A1 | 6/2008 | Lee et al. |
| 2008/0160976 A1 | 7/2008 | Virolainen et al. |
| 2008/0160977 A1 | 7/2008 | Ahmaniemi et al. |
| 2008/0187143 A1 | 8/2008 | Mak-Fan |
| 2008/0232568 A1 | 9/2008 | Diethorn |
| 2009/0086949 A1 | 4/2009 | Caspi et al. |
| 2009/0112589 A1 | 4/2009 | Hiselius et al. |
| 2009/0176505 A1* | 7/2009 | Van Deventer et al. .... 455/456.1 |
| 2010/0040217 A1 | 2/2010 | Aberg et al. |
| 2010/0112991 A1 | 5/2010 | Hannaby |
| 2010/0120465 A1 | 5/2010 | Chung |
| 2010/0205174 A1 | 8/2010 | Jiang et al. |
| 2010/0216490 A1 | 8/2010 | Linden |
| 2010/0316232 A1 | 12/2010 | Acero et al. |
| 2010/0332668 A1 | 12/2010 | Shah et al. |
| 2011/0294515 A1 | 12/2011 | Chen et al. |
| 2012/0083286 A1 | 4/2012 | Kim et al. |
| 2012/0131186 A1* | 5/2012 | Klos et al. ..................... 709/224 |
| 2012/0142324 A1 | 6/2012 | Kim et al. |
| 2012/0224707 A1 | 9/2012 | Kim et al. |

OTHER PUBLICATIONS

Azizyan, Martin, et al., "SurroundSense: Mobile Phone Localization via Ambience Fingerprinting", MobiCom'09, Sep. 20-25, 2009, Beijing, China, 12 pages.

Hong Lu et al., "SoundSense: Scalable Sound Sensing for People-Centric Applications on Mobile Phones", MobiSys'09, Jun. 22-25, 2009, Kraków, Poland, pp. 165-178.

Janson, et al., "Self-localization application for iPhone using only ambient sound signals", Dept. of Comput. Sci., Univ. of Freiburg, Freiburg, Germany. This paper appears in: Indoor Positioning and Indoor Navigation (IPIN), 2010 International Conference on Sep. 15-17, 2010, Zurich, pp. 1-2.

Martin Wirz, et al., "A wearable, ambient sound-based approach for infrastructureless fuzzy proximity estimation", In Proceedings of the 14th IEEE International Symposium on Wearable Computers (ISWC 2010). IEEE Computer Society, Oct. 2010.

Azizyan, et al., "SurroundSense: Mobile Phone Localization Using Ambient Sound and Light", ACM Sigmobile Mobile Computing and Communications Review, vol. 13, No. 1, Jan. 1, 2009, pp. 69-72.

Jain, A.K., et al., "Data Clustering: A Review", ACM Computing Surveys, vol. 31, No. 3, Sep. 1999, pp. 264-323.

International Search Report and Written Opinion of the International Searching Authority for International Application No. PCT/US2011/062544, Mailed on Feb. 20, 2012.

International Preliminary Report on Patentability for International Application No. PCT/US2011/062544 mailed Feb. 18, 2013, 23 pages.

Written Opinion of the International Preliminary Examining Authority for International Application No. PCT/US2012/025464 mailed Feb. 22, 2013, 5 pages.

* cited by examiner

METHOD AND APPARATUS FOR DETERMINING LOCATION OF MOBILE DEVICE

CLAIM OF PRIORITY UNDER 35 U.S.C. §119

The present Application for patent claims priority to Provisional Application No. 61/419,683, filed on Dec. 3, 2010, Provisional Application No. 61/450,010, filed on Mar. 7, 2011, and Provisional Application No. 61/485,574, filed on May 12, 2011, and assigned to the assignee hereof and hereby expressly incorporated by reference herein.

TECHNICAL FIELD

The present disclosure relates generally to determining a location of a mobile device with reference to locations of a plurality of reference devices having sound capturing capability. More specifically, the present disclosure relates to determining a location of a mobile device based on ambient sounds received by the mobile device and reference devices.

BACKGROUND

Modern mobile systems often provide a variety of services to mobile device users. For example, such systems provide advertising and social network services to users based on user locations. Knowing the locations of users' mobile devices allows the service providers to provide more targeted advertising and social network services to the users.

A conventional method determines the locations of mobile devices by using GPS (Global Positioning System). Unfortunately, GPS is often unavailable in many locations where mobile devices are used. For example, when the mobile devices are located in a building or indoor situation, the location information through GPS may not be available. In addition, GPS may not accurately distinguish between users in different vertical locations such as a user on one floor and another user on another floor.

Another method uses input sounds of mobile devices to determine the user locations. However, there are some cases where it may be difficult to determine the locations of the mobile devices based on ambient sounds. For example, if loud sound generated by a flying aircraft or a public announcement propagates through a large area, ambient sounds of mobile devices positioned within the area may not be distinguishable. Thus, the locations of mobile devices may not be determined accurately from the input sounds of the mobile devices.

SUMMARY

The present disclosure provides a method and apparatus for determining a location of a mobile device based on a similarity between ambient sounds from the mobile device and each of a plurality of reference devices.

According to one aspect of the present disclosure, a method for determining a location of a mobile device with reference to locations of a plurality of reference devices is disclosed. The method includes receiving ambient sound information from a mobile device and each of a plurality of reference devices. A degree of similarity of the ambient sound information between the mobile device and each of the plurality of reference devices is determined, and a location of the mobile device is determined to be a location of a reference device having the greatest degree of similarity. This disclosure also describes an apparatus, a combination of means, and a computer-readable medium relating to this method.

According to another aspect of the present disclosure, a server for determining a location of a mobile device with reference to locations of a plurality of reference devices is provided. The server includes a receiving unit and a location determining unit. The receiving unit is configured to receive ambient sound information from a mobile device and each of a plurality of reference devices. The location determining unit is adapted to determine a location of the mobile device by determining a degree of similarity of the ambient sound information between the mobile device and each of the plurality of reference devices. The location of the mobile device is determined to be a location of a reference device having the greatest degree of similarity.

BRIEF DESCRIPTION OF THE DRAWINGS

FIG. 8 depicts an exemplary environment where ambient sounds captured by reference devices at different locations are similar.

DETAILED DESCRIPTION

Figure 1:
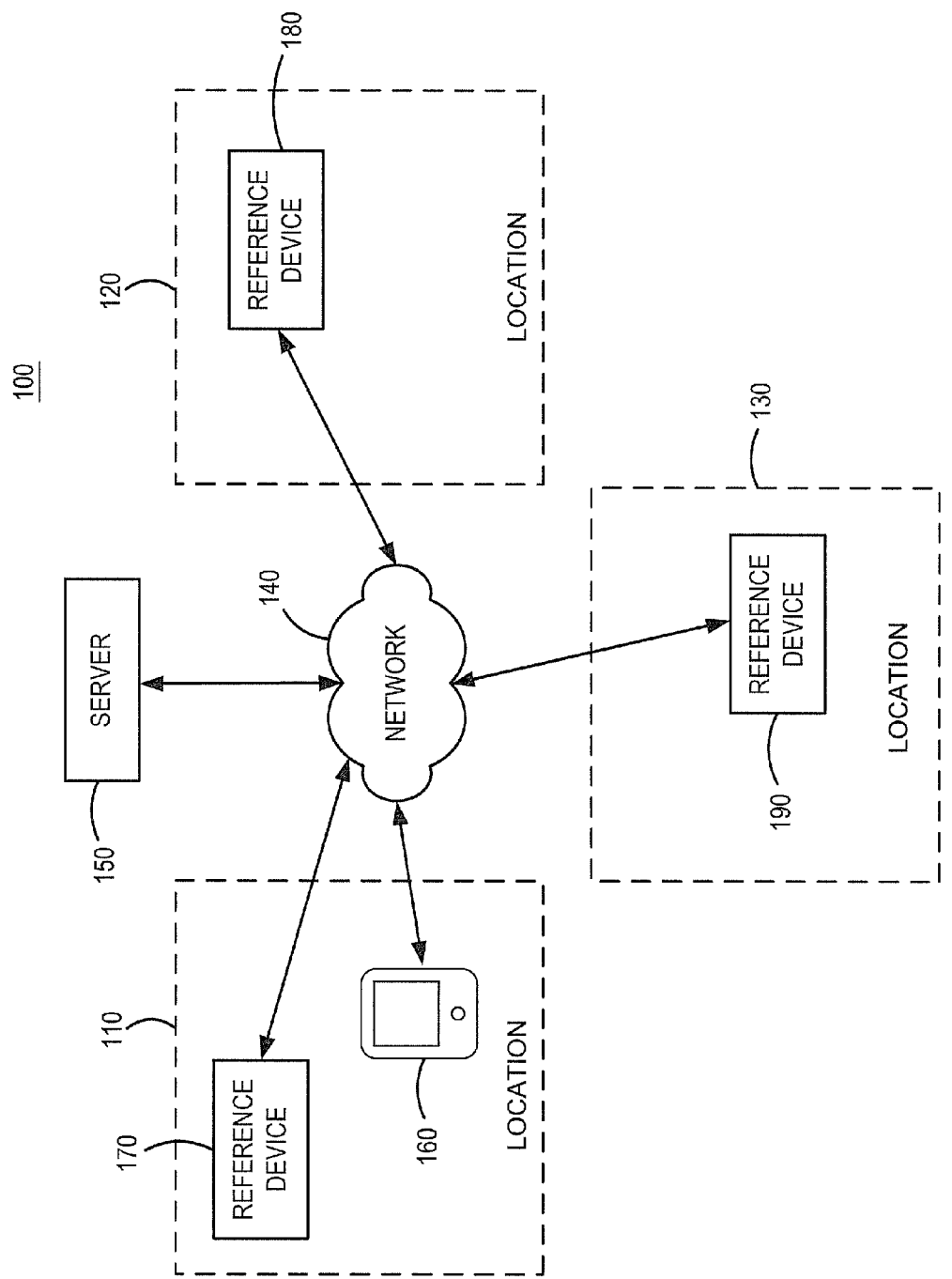
FIG. 1 illustrates an exemplary system for determining a location of a mobile device with reference to locations of a plurality of reference devices according to one embodiment of the present disclosure.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The location of a mobile device can be determined with reference to a plurality of reference devices positioned at predetermined locations. In this arrangement, if the mobile device is found to be close to one of the reference devices, then the location of the mobile device may be estimated to be the location of the nearby reference device.

In the present disclosure, a plurality of devices including sound sensors may serve as a plurality of reference devices, each placed at a predetermined location. Each reference device detects its ambient sound and transmits information associated with the ambient sound to a server. The location information of each reference device may be transmitted from the reference device to the server or pre-stored in the server. The mobile device also detects its ambient sound and transmits information associated with the ambient sound to the server. The server determines the location of the mobile device based on the information associated with the ambient sounds received from the mobile device and each of the plurality of reference devices, in the manner described below.

It is assumed that, if the mobile device is placed geographically proximate to one of the plurality of reference devices, the ambient sound detected by the mobile device will be similar to the ambient sound detected by the nearby reference device. According to one embodiment of the present disclosure, the server compares the ambient sound information from the mobile device and the ambient sound information from each reference device. The server estimates the location of the mobile device to be the predetermined location of the reference device having a similar ambient sound.

FIG. 1 illustrates an exemplary system 100 including a server 150 for determining a location of a mobile device 160 with reference to locations of a plurality of reference devices 170, 180, and 190 according to one embodiment of the present disclosure. The server 150, the mobile device 160, and the reference devices 170, 180, and 190 communicate with each other through a network 140. The reference devices 170, 180, and 190 are located in geographic locations 110, 120, and 130, respectively. The mobile device 160 is located in the location 110.

The mobile device 160 may be any suitable device such as a cellular phone, a smartphone, a laptop computer or a tablet personal computer equipped with sound capturing capability, e.g., a microphone, and communications capability through a data and/or communications network. Similarly, each reference device may be any suitable sound sensing device equipped with sound capturing capability, e.g., a microphone, and communications capability through a data and/or communications network. In the illustrated embodiment, the reference devices 170, 180, and 190 are presented only by way of example, and thus the number of reference device(s) located in each location and the number of location(s) may vary depending on individual system settings.

Figure 2:
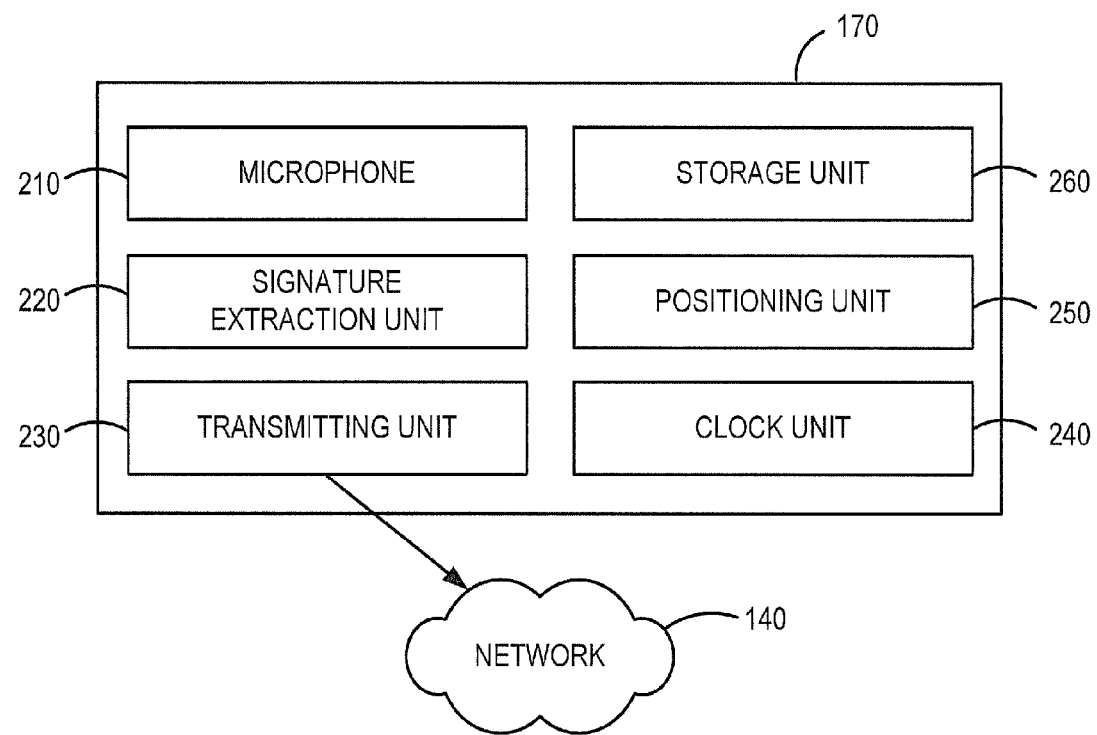
FIG. 2 shows a configuration of a reference device according to one embodiment of the present disclosure.

FIG. 2 depicts a configuration of the reference device 170 according to one embodiment of the present disclosure. As shown, the reference device 170 includes a microphone 210, a signature extraction unit 220, a transmitting unit 230, a clock unit 240, a positioning unit 250, and a storage unit 260. Although FIG. 2 depicts the configuration of the reference device 170, the same configuration may also be implemented in other reference devices 180 and 190. The above described units in the reference device 170 may be implemented by hardware, software executed in one or more processors, and/or the combination thereof.

The microphone 210 is configured to sense and receive an ambient sound around the reference device 170. For example, the microphone 210 may include one or more microphones or any other type of sound sensors used to detect, sense, and/or capture the ambient sound of the surroundings.

The signature extraction unit 220 extracts a sound signature, i.e., unique sound characteristics, from the ambient sound. By way of example, the signature extraction unit 220 may use any suitable signal processing methods, including speech and audio coding, compression, recognition, and analysis methods, to extract the sound signature of the ambient sound. Such signal processing scheme may employ spectrum analysis, MFCC (Mel-frequency cepstral coefficients), LPC (linear predictive coding), and/or LSP (line spectral pair) techniques, which are well-known methods for audio fingerprinting, speech recognition or speech and audio coding.

In one embodiment, a sound signature may include multiple components, which are represented as a vector having n-dimensional values. Under the MFCC method, for example, a sound signature may include thirteen dimensions with each dimension represented as a 16 bit value. In this case, the sound signature is 26 bytes long. In another embodiment, the sound signature may be binarized so that each dimension is represented as a 1 bit binary value. In such a case, the binarized sound signature may be 13 bits long.

The transmitting unit 230 transmits ambient sound information associated with the ambient sound through the network 140 to the server 150. The ambient sound information may include the sound signature of the ambient sound. The transmitting unit 230 may also transmit information relating to the reference device 170 including identification information, time information, and location information. For example, the identification information may include a product number, serial number, and ID of the reference device 170. The time information may include a current time or a time when the ambient sound is captured, which may be monitored by the clock unit 240. The location information may include a geographical location of the reference device 170, which may be pre-stored in the storage unit 260, for example, by a user or an operator of the reference device 170. In some alternative embodiments, the geographical location of the reference device 170 may be estimated by the positioning unit 250 using, for example, Global Positioning System (GPS). The storage unit 260 stores information processed and/or transmitted during the operation of the reference device 170.

In one embodiment of the present disclosure, a mobile device such as a smartphone may function as the reference device 170. In this case, the mobile device is equipped with the capabilities of the reference device 170 described above such as receiving an ambient sound, extracting a sound signature from the ambient sound, and transmitting ambient sound information and location information to the server 150. The location of the mobile device may be provided by its positioning function, for example, using Global Positioning System (GPS) or manually inputted by its user.

Figure 3:
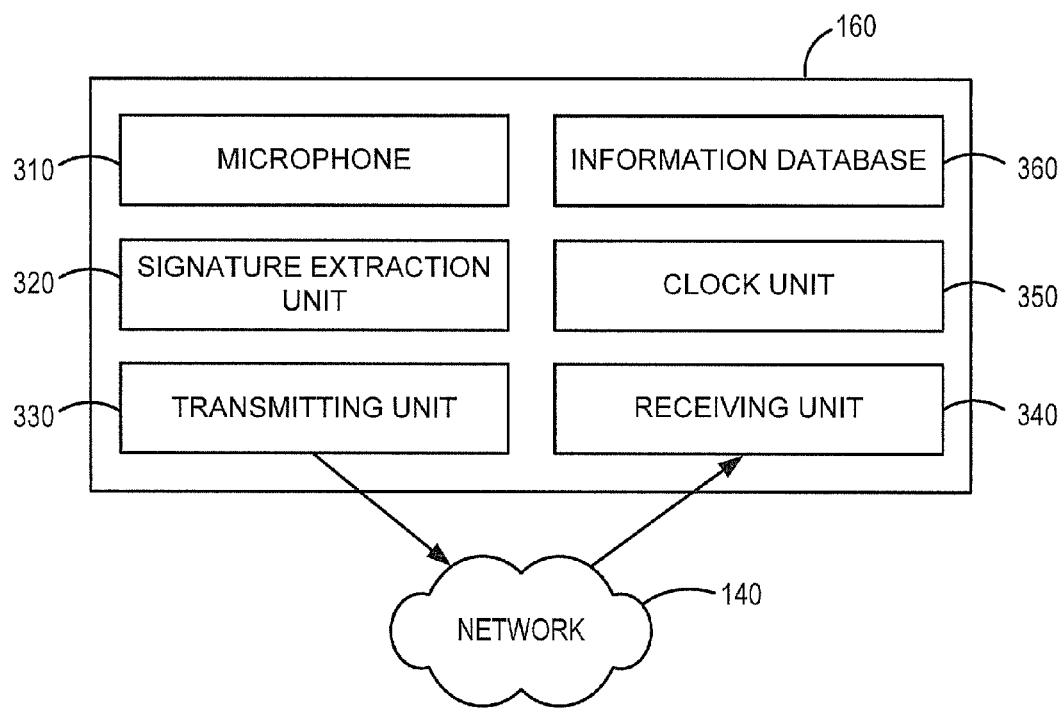
FIG. 3 shows a configuration of a mobile device according to one embodiment of the present disclosure.

FIG. 3 shows a configuration of a mobile device according to one embodiment of the present disclosure. As shown, the mobile device 160 includes a microphone 310, a signature extraction unit 320, a transmitting unit 330, a receiving unit 340, a clock unit 350, and a storage unit 360. The above described units in the mobile device 160 may be implemented by hardware, software executed in one or more processors, and/or the combination thereof.

The microphone 310 is configured to sense and receive an ambient sound around the mobile device 160. For example, the microphone 310 may include one or more microphones or any other type of sound sensors used to detect, sense, and/or capture the ambient sound of the surroundings. The microphone 310 may be a microphone built into the mobile device 160 for telephone calls or recording videos, or a microphone dedicated to receive ambient sound.

The signature extraction unit 320 extracts a sound signature, i.e., unique sound characteristics, from the ambient sound. By way of example, the signature extraction unit 320 may use any suitable signal processing methods, including speech and audio coding, compression, recognition, and analysis methods, to extract the sound signature of the ambient sound. Such signal processing scheme may employ spectrum analysis, MFCC (Mel-frequency cepstral coefficients), LPC (linear predictive coding), and/or LSP (line spectral pair) techniques, which are well-known methods for audio fingerprinting, speech recognition or speech and audio coding. As described above with respect to the reference device 170, the sound signature may include multiple components, which can be represented as a vector having n-dimensional values.

The transmitting unit 330 transmits ambient sound information associated with the ambient sound through the network 140 to the server 150. The ambient sound information may include the sound signature of the ambient sound. The transmitting unit 330 may also transmit information relating to the mobile device 160 and the user including identification information and time information. For example, the identification information may include a product number, serial number, and ID of the mobile device 160, user name, user profile, etc. The time information may include a current time or a time when the ambient sound is captured, which may be monitored by the clock unit 350.

The receiving unit 340 receives location information from the server 150 through the network 140 for storage in the storage unit 360 or display in a display unit (not shown). The storage unit 360 stores information processed, transmitted, and/or received during the operation of the mobile device 160.

Figure 4:
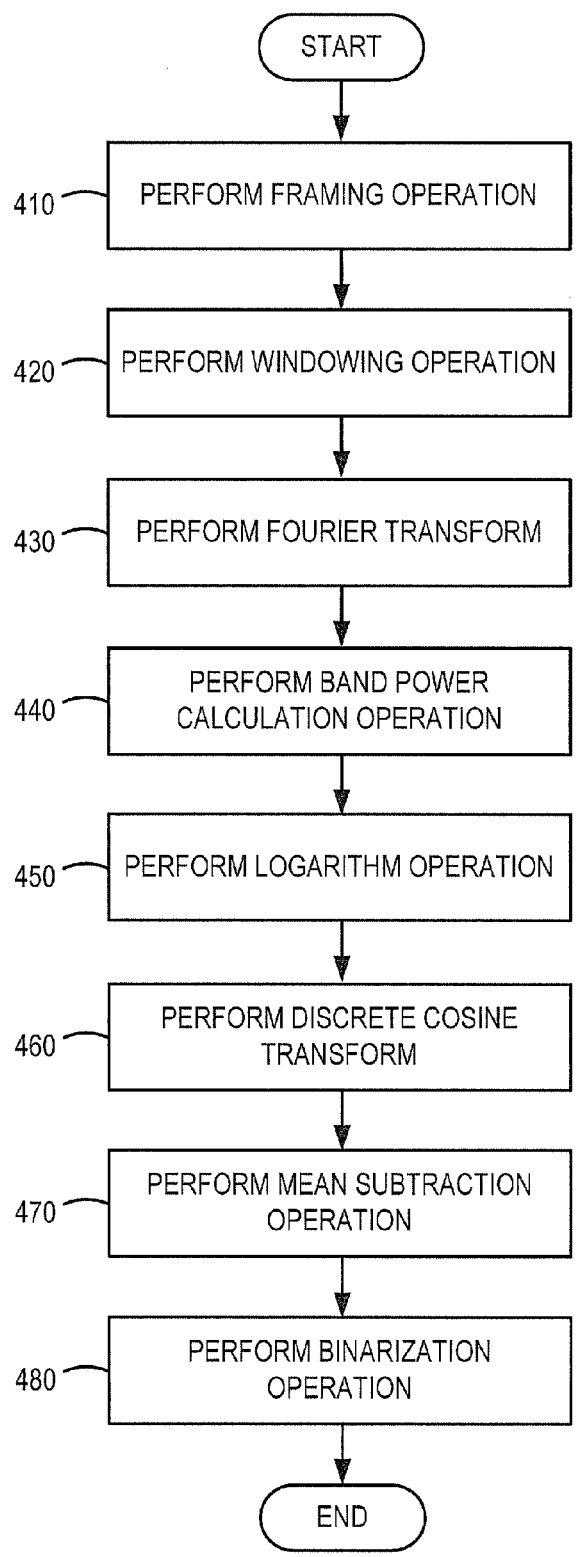
FIG. 4 illustrates a flowchart of an exemplary method of extracting a sound signature by a signature extraction unit in a reference device or a mobile device.

FIG. 4 illustrates a flowchart of an exemplary method of extracting a sound signature by the signature extraction unit 220 or 320 in a reference device 170 or a mobile device 160, respectively. For ease of explanation, although the method illustrated in FIG. 4 may be implemented in both signature extraction units 220 and 320 in the reference device 170 and mobile device 160, respectively, the method will be described below with reference to the signature extraction unit 220. The signature extraction unit 220 receives a captured ambient sound signal from the microphone 210 and performs a framing operation on the sound signal in a time domain to generate a frame of the sound signal, at 410. A windowing operation is then performed on the frame of the sound signal by applying a window function, e.g., a Hamming window function, to the frame of the sound signal, at 420. At 430, a Fourier transform operation is performed on the multiplied frame to transform the time domain signal to a frequency domain signal. Then, at 440, the spectrum of the frequency domain signal is divided into a plurality of bands and a power of the signal is calculated for each band. At 450, a logarithm operation is performed on each band power to generate a log-scaled power. A DCT (discrete cosine transform) operation is performed on each log-scaled band power to generate DCT coefficients, at 460. For each DCT coefficient, a mean value of the DCT coefficient over a predetermined period of time is subtracted from the DCT coefficient, at 470. Then, at 480, a binarization operation is performed on each subtracted DCT coefficient so that, if the subtracted DCT coefficient is positive, a binary value "1" is outputted; otherwise, a binary value "0" is outputted.

In one embodiment, instead of the Hamming window function, a Hanning window function, rectangular window function, cosine window function, triangular window function, Kaiser window function or any other suitable window functions may be applied to the frame of the sound signal, at 420. The Fourier transform at 430 may be replaced with a wavelet transform, filterbank analysis or the like. The logarithm operation at 450 is presented only by way of example and thus any other suitable monotonic nonlinear functions may be performed on the calculated band powers. Further, a cosine transform, Fourier transform, or any other suitable cepstral analysis transform method may be performed in place of the DCT operation at 460. The mean subtracting and binarizing operations at 470 and 480 may be optional and, in one embodiment, the coefficients generated at 460 can be used as the sound signature without binarization.

Figure 5:
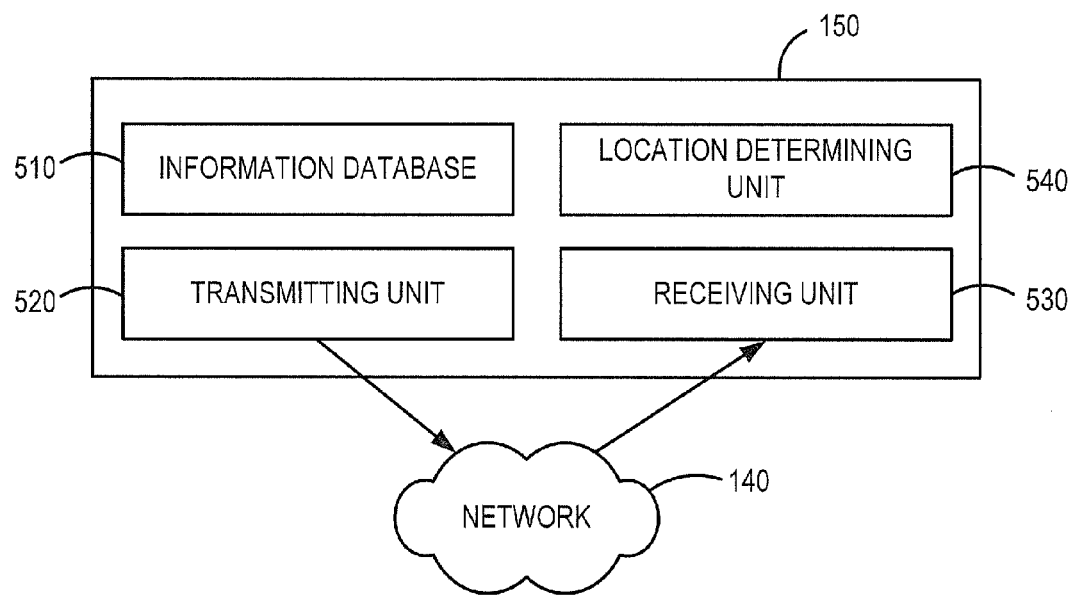
FIG. 5 depicts a configuration of a server according to one embodiment of the present disclosure.

FIG. 5 illustrates a configuration of the server 150 according to one embodiment of the present disclosure. As shown, the server 150 includes an information database 510, a transmitting unit 520, a receiving unit 530, and a location determining unit 540. The above described units in the server 150 may be implemented by hardware, software executed in one or more processors, and/or the combination thereof.

The receiving unit 530 receives the ambient sound information and other information described above from the mobile device 160 and the reference devices 170, 180, and 190. The location determining unit 540 determines the location of the mobile device 160 based on the received information. The transmitting unit 520 may transmit location information to the mobile device 160. The information database 510 stores information transmitted and/or received during the operation of the server 150.

Figure 6:
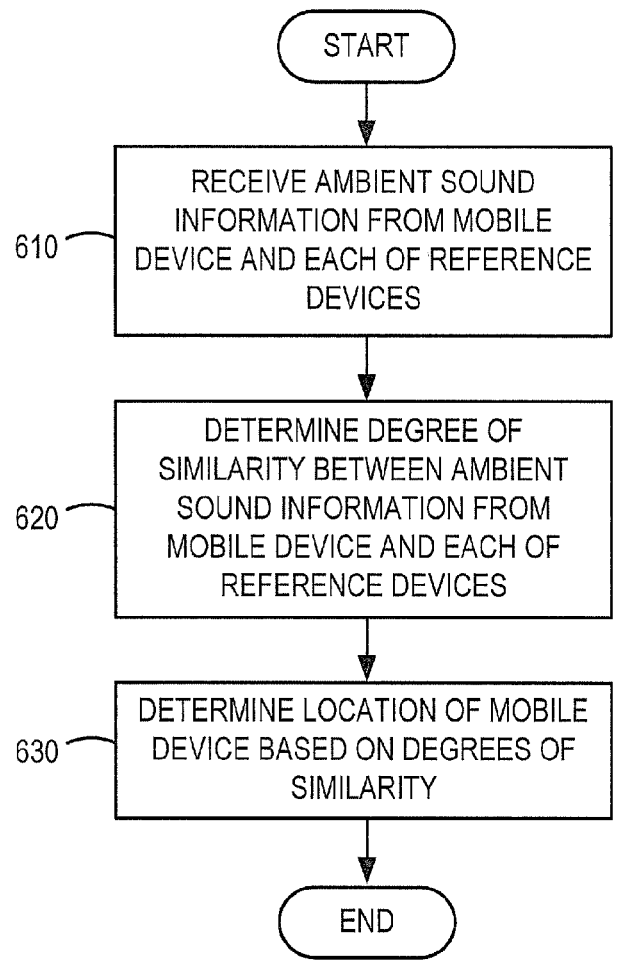
FIG. 6 shows a flowchart of a method for determining a location of a mobile device with reference to locations of one or more reference devices according to one embodiment of the present disclosure.

FIG. 6 shows a flowchart of a method, performed by the server 150, for determining a location of the mobile device 160 with reference to the locations of the reference devices 170, 180, and 190 according to one embodiment of the present disclosure. The receiving unit 530 in the server 150 receives the ambient sound information and may also receive information relating to the reference device (e.g., identification, location, and time information) from each of the reference devices 170, 180, and 190, at 610. The receiving unit 530 also receives the ambient sound information and may also receive information relating to the mobile device 160 and the user (e.g., identification, time, user information) from the mobile device 160, at 610.

The location determining unit 540 compares the ambient sound information from the mobile device 160 with the ambient sound information from each of the reference devices 170, 180, and 190 to determine a degree of similarity (e.g., a similarity value) between the ambient sound information from the mobile device 160 and each of the reference devices 170, 180, and 190, at 620. In one embodiment of the present disclosure, the degree of similarity may be determined based on a Euclidean distance between vectors respectively representing the sound signatures of the ambient sounds of the mobile device 160 and the reference device 170. For example, the degree of similarity may be a reciprocal of the Euclidean distance or a log-scaled value of the reciprocal. Such a Euclidean distance may be calculated, e.g., according to the following equation:

$$\text{Euclidean Distance} = \sum_i |a[i] - b[i]|^2$$

where a[i] indicates an i-th dimension value of the vector representing the sound signature of the mobile device 160, and b[i] indicates an i-th dimension value of the vector representing the sound signature of the reference device 170.

The degree of similarity between the ambient sound information from the mobile device 160 and the reference device 170 may be determined based on a Euclidean distance between a pair of sound signature sequences that are extracted over a period of time at predetermined time intervals. If a sequence of sound signatures is extracted at time intervals of 10 ms over a period of 1 sec in each of the mobile device 160 and the reference device 170, the server 150 will receive one hundred pairs of sound signatures from the mobile device 160 and the reference device 170. In this case, a Euclidean distance for each pair of sound signatures from the mobile device 160 and the reference device 170 is calculated and the degree of similarity is determined based on a mean value of the Euclidean distances. Similar to the above, the degree of similarity may be a reciprocal of the mean value or a log-scaled value of the reciprocal.

Thereafter, the location determining unit 540 determines the location of the mobile device 160 based on the determined degree of similarity between the ambient sound information from the mobile device and each of the reference devices 170, 180, and 190, at 630. According to one embodiment of the present disclosure, a closest reference device having the greatest degree of similarity in ambient sound to that of the mobile device 160 is determined. The location of the mobile device 160 is then determined to be the location of the closest reference device.

Figure 7:
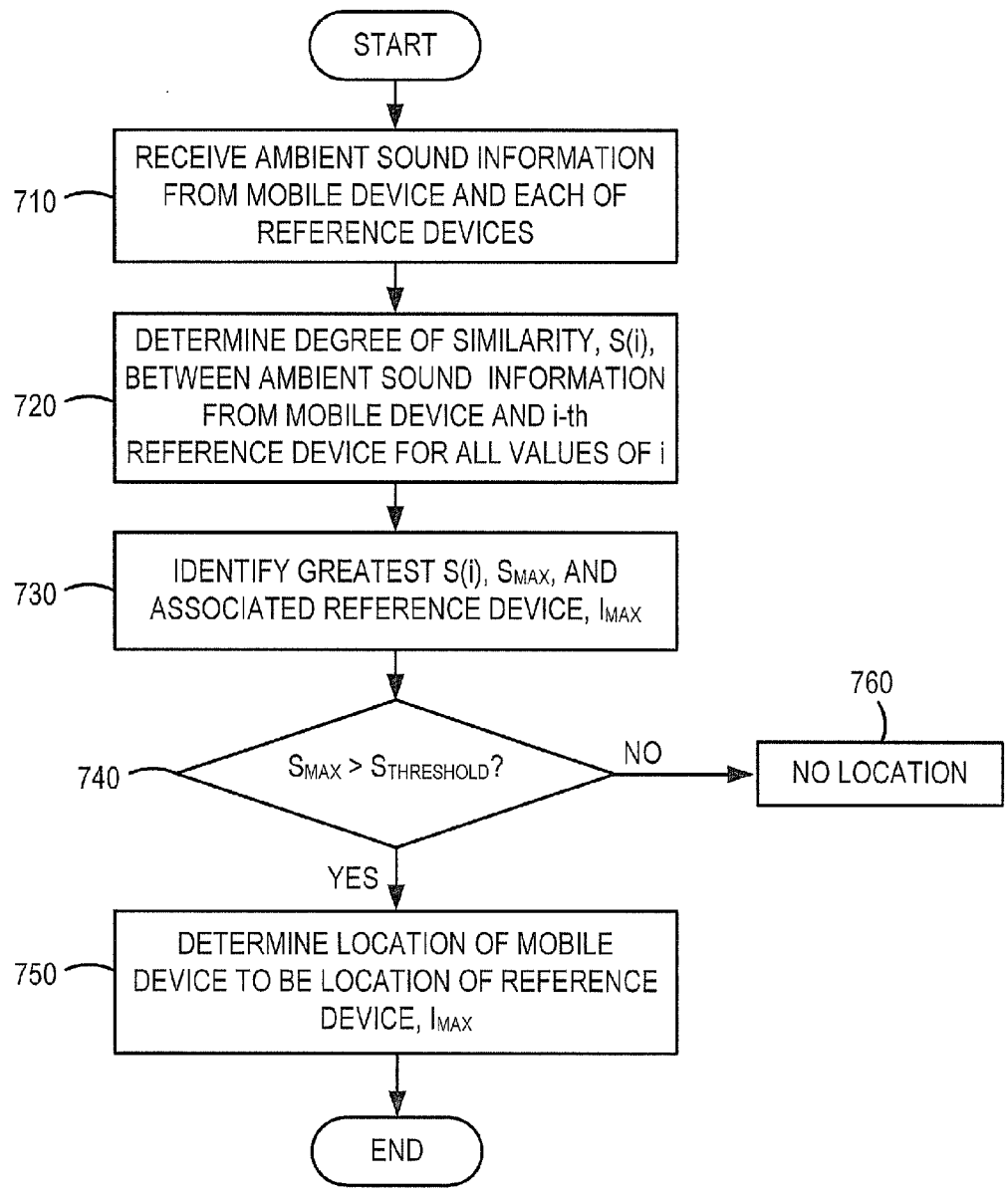
FIG. 7 illustrates a flowchart of a method for determining a location of a mobile device by using a similarity threshold according to one embodiment of the present disclosure.

FIG. 7 illustrates a flowchart of a method, implemented in the server 150, for determining a location of the mobile device 160 by using a similarity threshold according to one embodiment of the present disclosure. The similarity threshold is a predetermined degree of similarity indicating a minimum degree of similarity of the ambient sounds between the mobile device 160 and the closest reference device to ensure a desired confidence level for the greatest degree of similarity obtained.

In this embodiment, the server 150 receives the ambient sound information from each of the reference devices 170, 180, and 190 and the ambient sound information from the mobile device 160, at 710. The location determining unit 540 compares the ambient sound information from the mobile device 160 with the ambient sound information from each of the reference devices 170, 180, and 190 to determine a degree of similarity S(i) between the ambient sound information from the mobile device 160 and an i-th reference device of the reference devices 170, 180, and 190, at 720. In this case, the index i represents the number of reference devices and ranges from one to three. The degree of similarity S(i) may be determined in the manner described above. Then, at 730, the greatest degree of similarity $S_{max}$ is identified among the determined degrees of similarity and a closest reference device $I_{max}$ associated with the greatest degree of similarity $S_{max}$ is identified among the reference devices 170, 180, and 190.

At 740, the location determining unit 540 compares the greatest degree of similarity $S_{max}$ to a similarity threshold $S_{threshold}$. The similarity threshold $S_{threshold}$ may be a predetermined value depending on a required accuracy in determining the location of the mobile device 160. For example, if a more precise location determination is required, e.g., when reference devices are spaced relatively close to each other, $S_{threshold}$ may be set to be greater. In this case, $S_{threshold}$ may be normalized to a value greater than 0.5 and less than or equal to 1.0. For a less precise location determination, e.g., when reference devices are spaced relatively far apart, $S_{threshold}$ may be set to be smaller. In this case, $S_{threshold}$ may be normalized to a value greater than 0.0 and smaller than or equal to 0.5.

If the greatest degree of similarity $S_{max}$ is determined to be greater than the similarity threshold $S_{threshold}$, at 740, the location determining unit 540 determines the location of the mobile device 160 to be the location of the closest reference device $I_{max}$, at 750. Otherwise, if the greatest degree of similarity $S_{max}$ is determined to be less than or equal to the similarity threshold $S_{threshold}$, at 740, the similarity threshold $S_{threshold}$ has not been exceeded and no location is determined for the mobile device 160, at 760.

Figure 8:
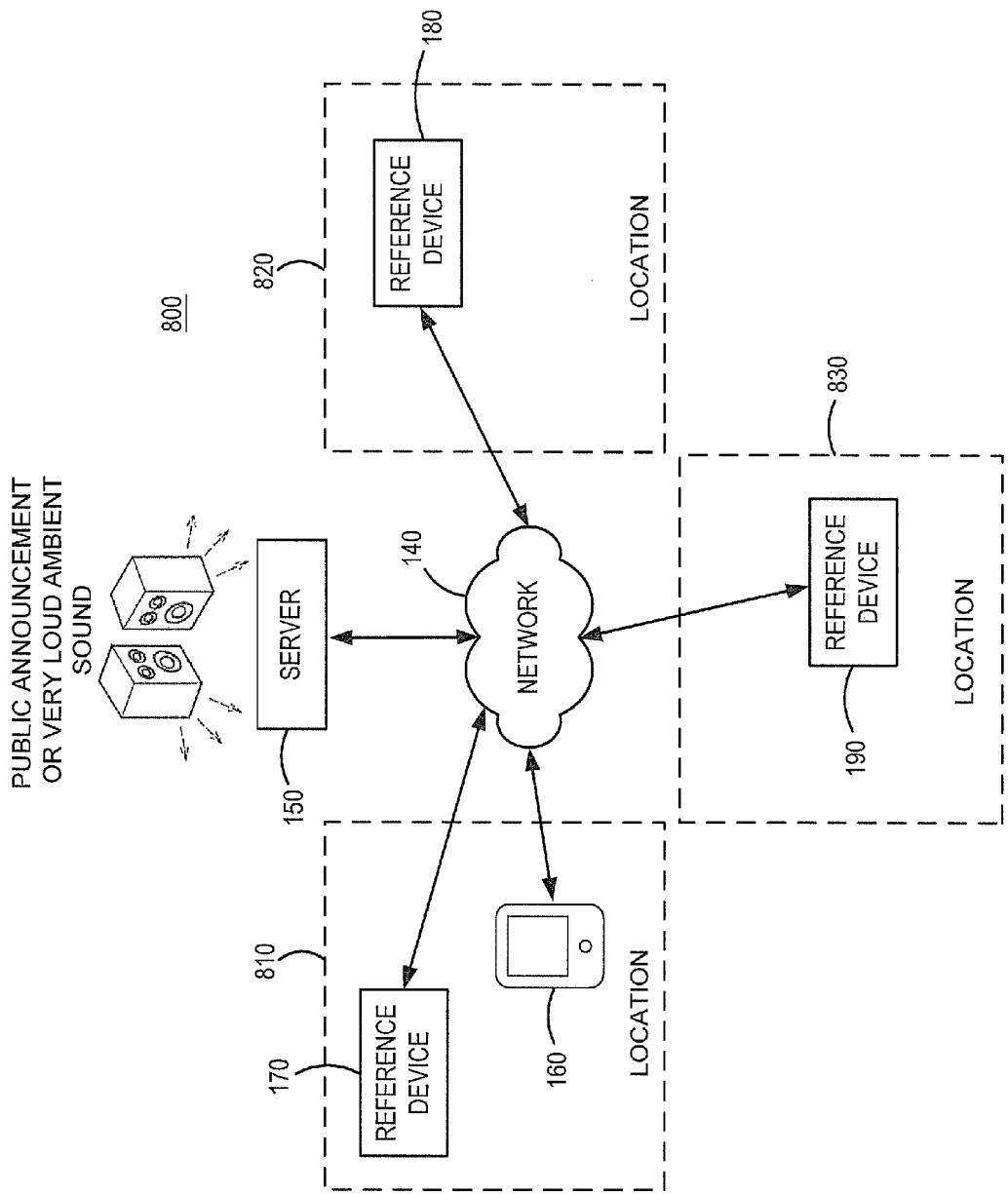

FIG. 8 illustrates a modified system environment 800 in which ambient sounds are captured by reference devices 170, 180, and 190 positioned at different but relatively proximate locations 810, 820, and 830 according to one embodiment of the present disclosure. In such an environment, the ambient sounds of the reference devices 170, 180, and 190 may be similar due to a loud noise, a public announcement, a sound of an aircraft flying over the locations, or the like. In typical situations, such ambient sounds often last for a short period of time. Thus, one way to prevent inaccuracies in location determination is to discard any location determination results during the period of time when such unusually loud sounds are captured.

Figure 9:
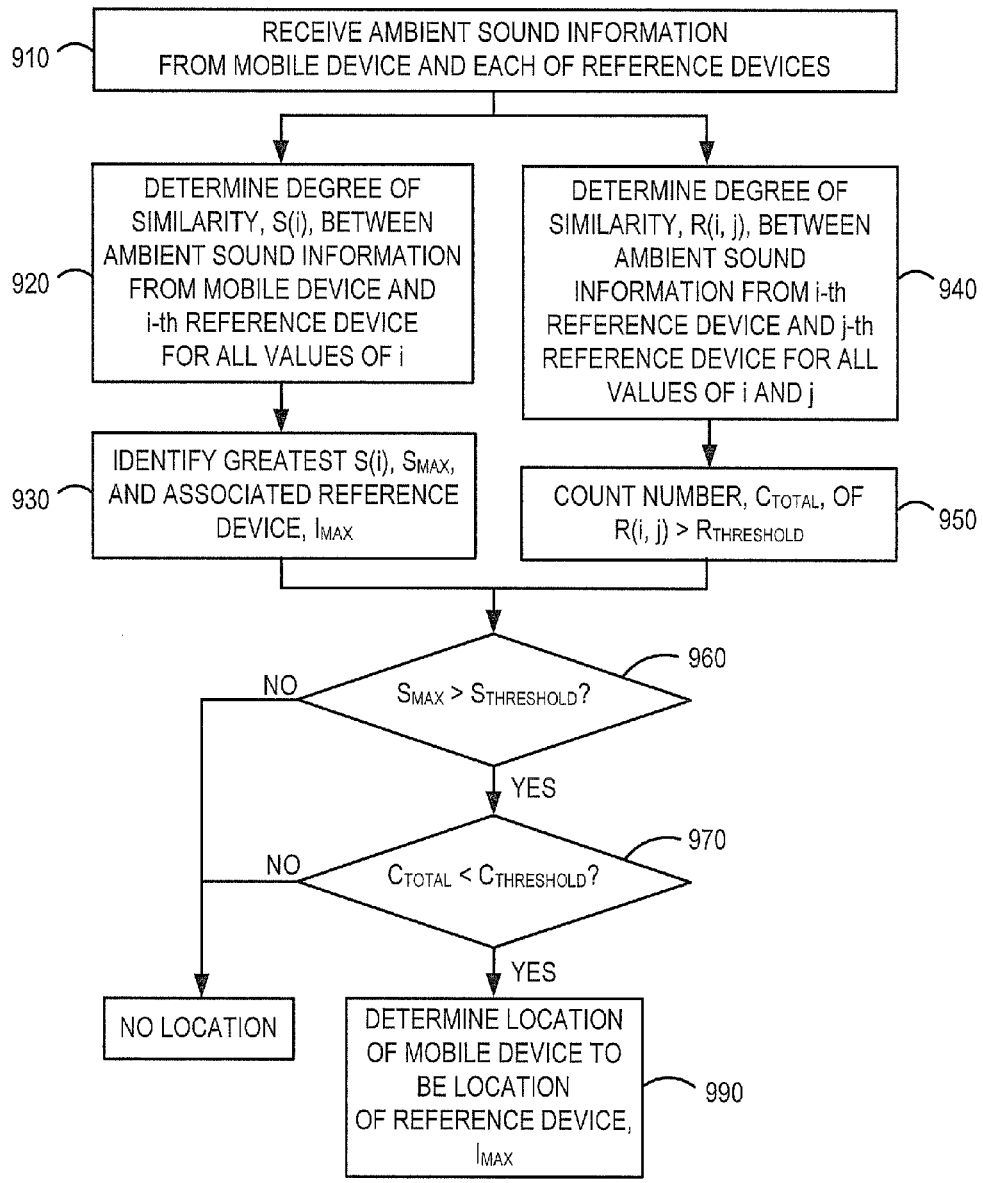
FIG. 9 illustrates a flowchart of a method for determining a location of a mobile device according to the number of reference devices detecting similar ambient sounds, in accordance with one embodiment of the present disclosure.

FIG. 9 illustrates a flowchart of a method for determining a location of the mobile device 160 according to the number of reference devices receiving similar ambient sounds, in accordance with one embodiment of the present disclosure. The method shown in FIG. 9 may be implemented in the receiving unit 530 and location determining unit 540 of the server 150. The server 150 receives ambient sound information from the mobile device 160 and each of the reference devices 170, 180, and 190, at 910. The location determining unit 540 compares the ambient sound information from the mobile device 160 with the ambient sound information from each of the reference devices 170, 180, and 190 to determine a degree of similarity S(i) between the ambient sound information from the mobile device 160 and an i-th reference device of the reference devices 170, 180, and 190, at 920. In this case, the index i represents the number of reference devices and ranges from one to three. The degree of similarity S(i) may be determined in the manner described above. Then, at 930, the greatest degree of similarity $S_{max}$ is identified among the determined degrees of similarity and a closest reference device $I_{max}$ associated with the greatest degree of similarity $S_{max}$ is identified among the reference devices 170, 180, and 190.

At 940, the ambient sound information from each pair of the reference devices 170, 180, and 190 is compared to determine a degree of similarity R(i, j) of the ambient sound information between an i-th reference device and a j-th reference device of the reference devices 170, 180, and 190, for all values of i and j, where i and j are indexes representing the number of the reference device and, in this embodiment, range from one to three. The degree of similarity R(i, j) may be determined in the manner described above. When i and j are equal, the indexes indicate the same reference device and thus the degree of similarity R(i, j) is not determined.

At 950, the number of reference devices capturing similar ambient sounds is counted to produce $C_{total}$ representing the total count number. In one embodiment, the degree of similarity R(i, j) between the i-th reference device and j-th reference device is compared with a similarity threshold $R_{threshold}$, which is a predetermined degree of similarity indicating a minimum similarity level to ensure a desired confidence level. If $R(i, j)$ is greater than $R_{threshold}$, the associated pair of reference devices are determined to capture similar ambient sounds. The operations of determining the degree of similarity $R(i, j)$, at 940, and counting the count number $C_{total}$, at 950, may be performed prior, subsequent, or parallel to the operations of determining the degree of similarity $S(i)$, at 920, and identifying the greatest degree of similarity $S_{max}$ and the closest reference device $I_{max}$, at 930.

At 960, the greatest degree of similarity $S_{max}$ is compared with a similarity threshold $S_{threshold}$ as described for 740 in FIG. 7 above. If the greatest degree of similarity $S_{max}$ is greater than the similarity threshold $S_{threshold}$, the count number $C_{total}$ is compared with a count threshold $C_{threshold}$, at 970. Otherwise, if the greatest degree of similarity $S_{max}$ is determined to be less than or equal to the similarity threshold $S_{threshold}$, the similarity threshold $S_{threshold}$ has not been exceeded and no location is determined for the mobile device 160, at 980. It should be appreciated that the comparison operation at 970 may be performed prior to the comparison operation at 960.

At 970, the count threshold $C_{threshold}$ represents a predetermined number of reference devices capturing similar ambient sounds that indicates a desired confidence level. The count threshold $C_{threshold}$ may be a predetermined integer, e.g., equal to or greater than 2. If the count number $C_{total}$ is less than the count threshold $C_{threshold}$, at 970, the location of the mobile device 160 is determined to be the location of the closest reference device $I_{max}$, at 990. Otherwise, the count number $C_{total}$ does not meet the count threshold $C_{threshold}$ and no location is determined for the mobile device 160, at 980.

Figure 10:
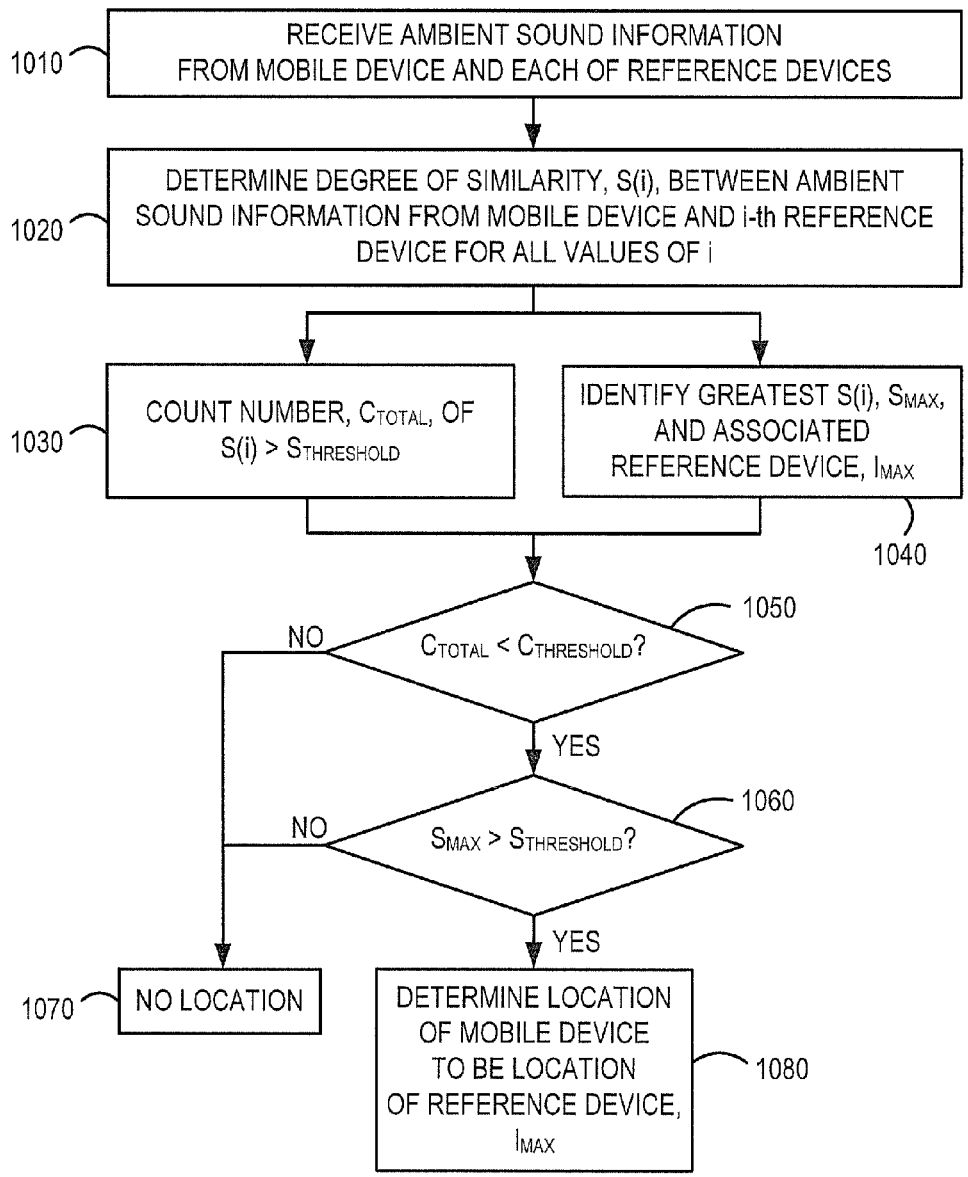
FIG. 10 illustrates a flowchart of a method for determining a location of a mobile device according to the number of reference devices detecting ambient sounds similar to that of the mobile device, in accordance with one embodiment of the present disclosure.

FIG. 10 shows a flowchart of a method for determining the location of the mobile device 160 according to the number of reference devices detecting ambient sounds similar to that of the mobile device 160, in accordance with one embodiment of the present disclosure. The method shown in FIG. 10 may be implemented in the receiving unit 530 and location determining unit 540 of the server 150. The server 150 receives the ambient sound information from the mobile device 160 and each of the reference devices 170, 180, and 190, at 1010. The location determining unit 540 compares the ambient sound information from the mobile device 160 with the ambient sound information from each of the reference devices 170, 180, and 190 to determine a degree of similarity $S(i)$ between the ambient sound information from the mobile device 160 and an i-th reference device of the reference devices 170, 180, and 190, at 1020. In this case, the index i represents the number of reference devices and ranges from one to three. The degree of similarity $S(i)$ may be determined in the manner described above.

At 1030, the number of degrees of similarity greater than a similarity threshold $S_{threshold}$, as described at 740 in FIG. 7 above, is counted to produce $C_{total}$ representing the total count number. At 1040, the greatest degree of similarity $S_{max}$ is identified among the determined degrees of similarity and a closest reference device $I_{max}$ associated with the greatest degree of similarity $S_{max}$ is identified among the reference devices 170, 180, and 190. The operation of identifying the greatest degree of similarity $S_{max}$ and the closest reference device $I_{max}$, at 1040, may be performed prior, subsequent, or parallel to the operation of counting the count number $C_{total}$, at 1030.

At 1050, the count number $C_{total}$ is then compared with a count threshold $C_{threshold}$. If the count number $C_{total}$ is less than the count threshold $C_{total}$, the greatest degree of similarity $S_{max}$ is compared with the similarity threshold $S_{threshold}$, at 1060. Otherwise, if the count number $C_{total}$ is greater than or equal to the count threshold $C_{threshold}$, the count number $C_{total}$ does not meet the count threshold $C_{threshold}$ and no location is determined for the mobile device 160, at 1070. At 1050, the count threshold $C_{threshold}$ represents a predetermined number of reference devices capturing ambient sounds similar to that of the mobile device 160 that indicates a desired confidence level. The count threshold $C_{threshold}$ may be a predetermined integer, e.g., equal to or greater than 2. It should be appreciated that the comparison operation at 1060 may be performed prior to the comparison operation at 1050.

At 1060, if the greatest degree of similarity $S_{max}$ is greater than the similarity threshold $S_{threshold}$, the location of the mobile device 160 is determined to be the location of the closest reference device $I_{max}$ at 1080. Otherwise, the greatest degree of similarity $S_{max}$ does not exceed the similarity threshold. $S_{threshold}$ and no location is determined for the mobile device 160, at 1070.

In one embodiment, the comparison operation, at 1060, of comparing $S_{max}$ with $S_{threshold}$ may be omitted, when the count number $C_{total}$ is determined to be equal to zero, at 1030. In this case, no location for the mobile device 160 is determined, at 1070.

Figure 11:
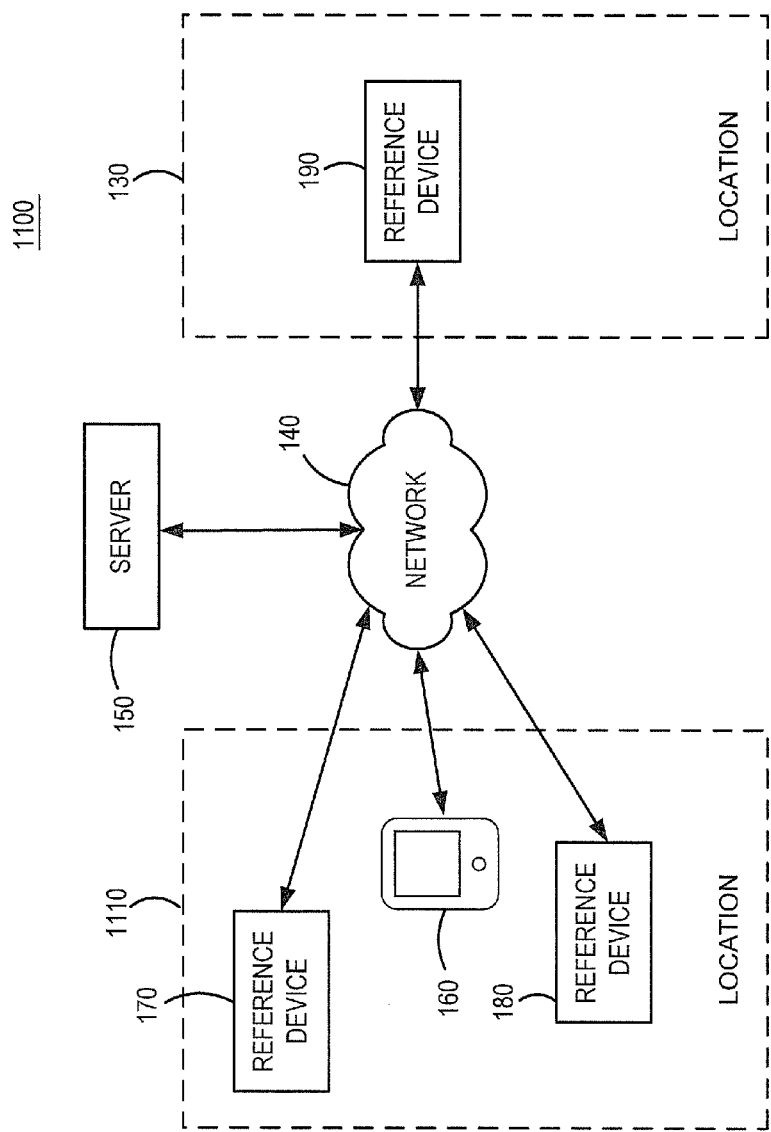
FIG. 11 depicts an exemplary environment in which some reference devices are located in the same area.

FIG. 11 illustrates a modified system environment 1100 in which the reference devices 170 and 180 are positioned in the same location 1110 according to one embodiment of the present disclosure. In this environment, the reference devices 170 and 180 may capture similar ambient sounds due to their presence in the same location 1110. Thus, it may be difficult to determine the precise location of the mobile device 160 with reference to the locations of the reference devices 170 and 180.

Figure 12:
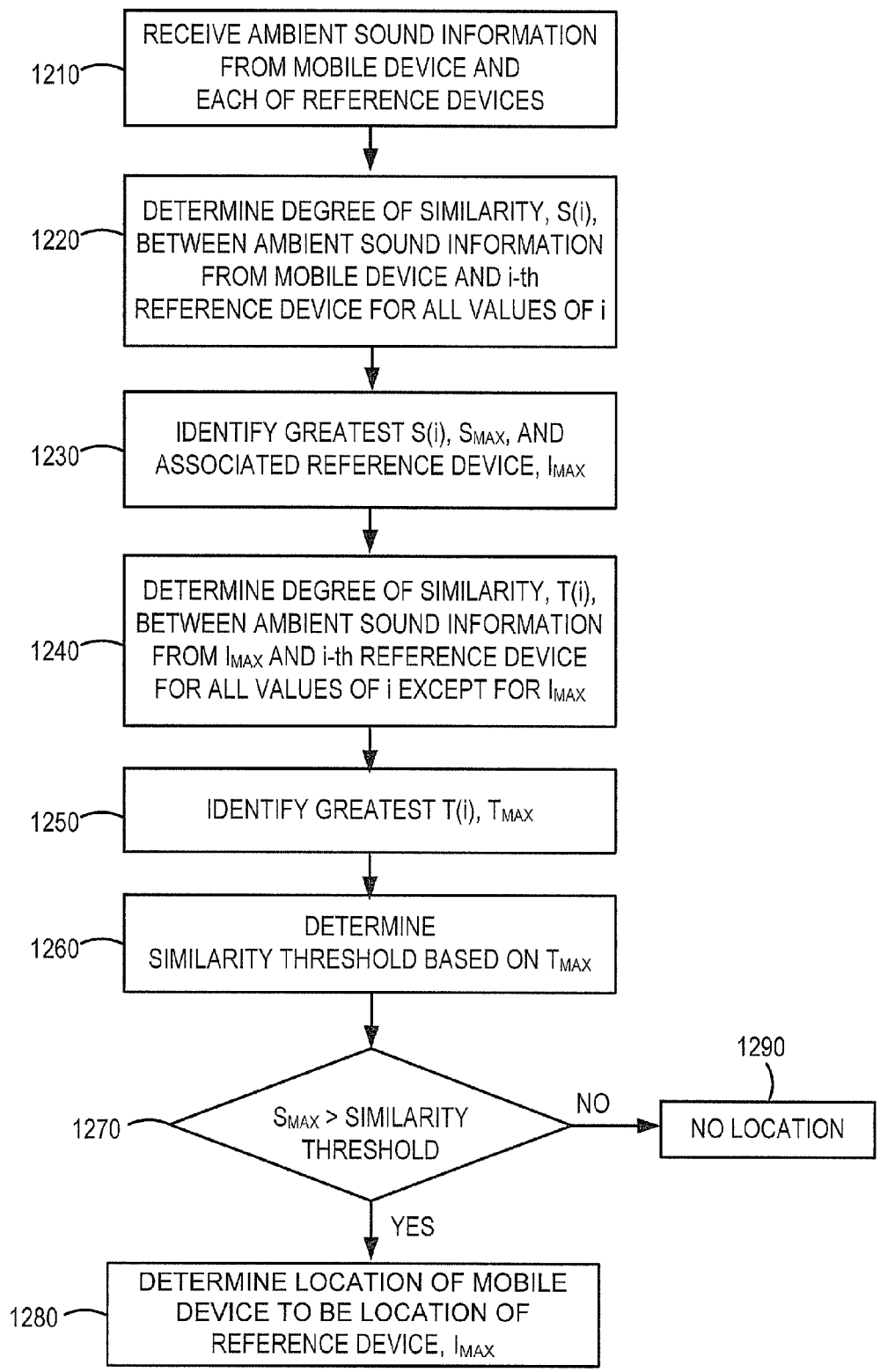
FIG. 12 shows a flowchart of a method for determining a location of a mobile device according to a degree of similarity between ambient sounds of reference devices in the same area, in accordance with one embodiment of the present disclosure.

FIG. 12 illustrates a flowchart of a method for determining the location of the mobile device 160 according to the degree of similarity between ambient sounds of the reference devices 170 and 180 in the same location 1110, in accordance with one embodiment of the present disclosure. The method shown in FIG. 12 may be implemented in the receiving unit 530 and location determining unit 540 of the server 150. The server 150 receives the ambient sound information from the mobile device 160 and the ambient sound information from each of the reference devices 170, 180, and 190, at 1210. The location determining unit 540 compares the ambient sound information from the mobile device 160 with the ambient sound information from each of the reference devices 170, 180, and 190 to determine a degree of similarity $S(i)$ between the ambient sound information from the mobile device 160 and an i-th reference device of the reference devices 170, 180, and 190, at 1220. In this case, the index i represents the number of reference devices and ranges from one to three. The degree of similarity $S(i)$ may be determined in the manner described above. Then, at 1230, the greatest degree of similarity $S_{max}$ is identified among the determined degrees of similarity and a closest reference device $I_{max}$ associated with the greatest degree of similarity $S_{max}$ is identified among the reference devices 170, 180, and 190.

At 1240, the location determining unit 540 determines a degree of similarity $T(i)$ between the ambient sound information from the closest reference device $I_{max}$ and an i-th reference device for all values of i except for the closest reference device $I_{max}$, i.e., each of the other reference devices, at 1240. In the example of FIG. 11, the degree of similarity of the ambient sound information from the mobile device 160 and the reference device 170 may be greatest and thus the reference device 170 will be determined to be the closest reference device $I_{max}$. Then, the location determining unit 540 determines the degrees of similarity between the ambient sound information from the pairs of the reference devices 170 and 180, and the reference devices 170 and 190, at 1240. Then, at 1250, the greatest degree of similarity $T_{max}$ is identified among the determined degrees of similarity between the reference devices.

A similarity threshold is determined based on the greatest degree of similarity $T_{max}$, at 1260. The similarity threshold is a value indicating a minimum degree of similarity of the ambient sounds between the mobile device 160 and the closest reference device $I_{max}$ to ensure a desired confidence level for the greatest degree of similarity obtained. The similarity threshold may be determined in various ways. For example, as the greatest degree of similarity $T_{max}$ is determined to be greater, the similarity threshold may be determined to be greater. For another example, the similarity threshold may be determined based on the greatest degree of similarity $T_{max}$ and a predetermined similarity threshold, e.g., by the following equation:

$$\tilde{T}(I_{max}) = \max(\alpha \cdot T_{max}, S_{threshold})$$

where $\tilde{T}(I_{max})$ is the similarity threshold, $S_{threshold}$ is a predetermined similarity threshold and $\alpha$ is a weighting coefficient for the greatest degree of similarity $T_{max}$ which varies depending on implementations of the present disclosure.

At 1270, the greatest degree of similarity $S_{max}$ is compared to the determined similarity threshold. If the greatest degree of similarity $S_{max}$ is determined to be greater than the similarity threshold, the location determining unit 540 determines the location of the mobile device 160 to be the location of the closest reference device $I_{max}$, at 1280. Otherwise, if the greatest degree of similarity $S_{max}$ is determined to be less than or equal to the similarity threshold, the similarity threshold $S_{threshold}$ has not been exceeded and no location is determined for the mobile device 160, at 1290.

Figure 13:
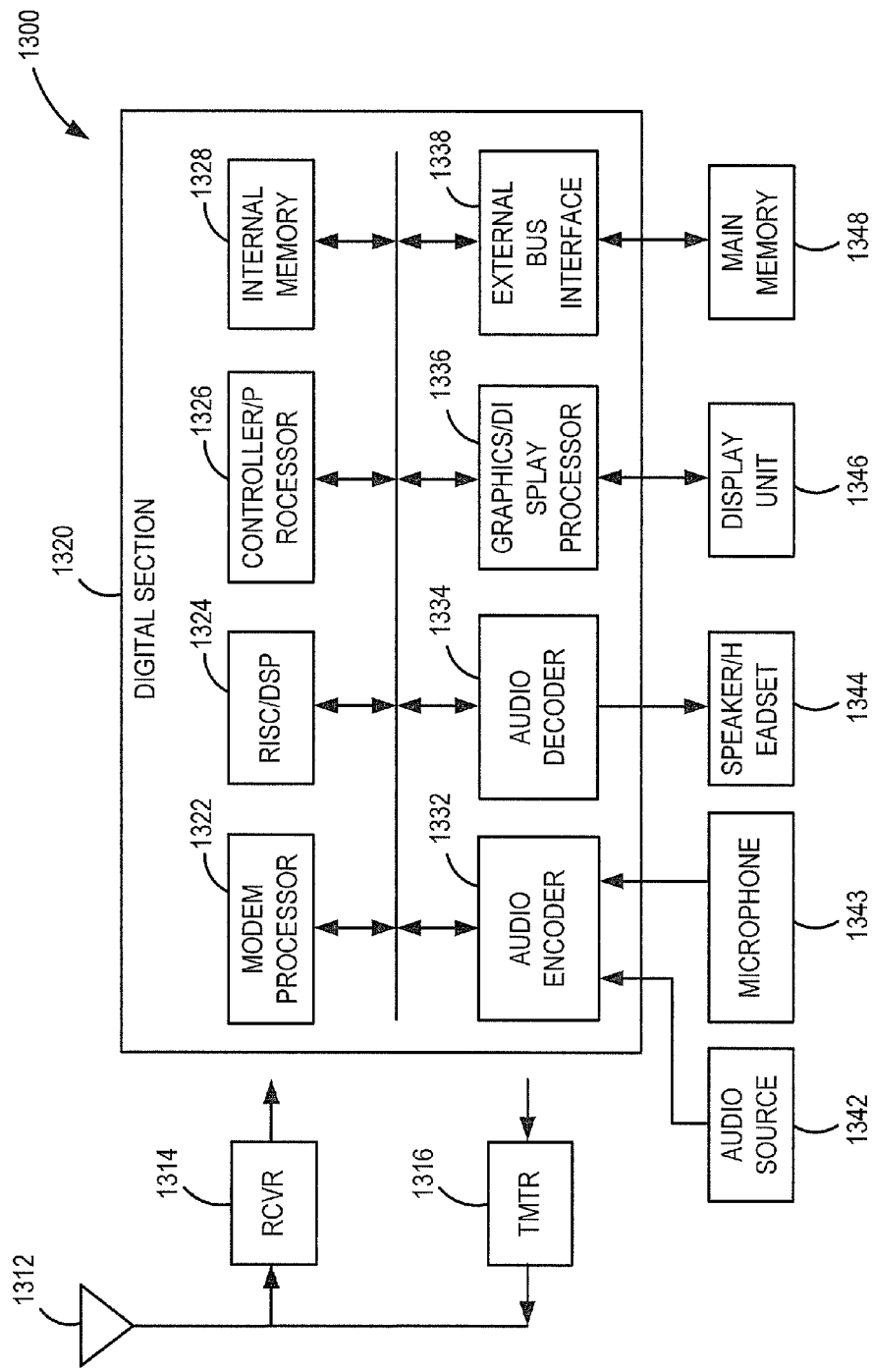
FIG. 13 is a block diagram of an exemplary mobile device in a wireless communication system according to one embodiment of the present disclosure.

FIG. 13 is a block diagram of an exemplary mobile device 1300 in a wireless communication system according to one embodiment of the present disclosure. The configuration of the mobile device 1300 may be implemented in the mobile device 160. The mobile device 1300 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, etc.

The mobile device 1300 is capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides the conditioned and digitized signal to a digital section 1320 for further processing. On the transmit path, a transmitter (TMTR) 1310 receives data to be transmitted from a digital section 1320, processes and conditions the data, and generates a modulated signal, which is transmitted via the antenna 1312 to the base stations. The receiver 1314 and the transmitter 1316 may be part of a transceiver that may support CDMA, GSM, W-CDMA, LTE, LTE Advanced, etc.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio encoder 1332, a generalized audio decoder 1334, a graphics/display processor 1336, and an external bus interface (EBI) 1338. The modem processor 1322 may process data transmission and reception, e.g., encoding, modulation, demodulation, and decoding. The RISC/DSP 1324 may perform general and specialized processing for the mobile device 1300. The controller/processor 1326 may control the operation of various processing and interface units within the digital section 1320. The internal memory 1328 may store data and/or instructions for various units within the digital section 1320.

The generalized audio encoder 1332 may perform encoding for input signals from an audio source 1342, a microphone 1343, etc. The generalized audio decoder 1334 may decode coded audio data and may provide output signals to a speaker/headset 1344. It should be noted that the generalized audio encoder 1332 and the generalized audio decoder 1334 are not necessarily required for interface with the audio source, the microphone 1343 and the speaker/headset 1344, and thus may be omitted in the mobile device 1300. The graphics/display processor 1336 may process graphics, videos, images, and texts, which may be presented to a display unit 1346. The EBI 1338 may facilitate transfer of data between the digital section 1320 and a main memory 1348.

The digital section 1320 may be implemented with one or more processors, DSPs, microprocessors, RISCs, etc. The digital section 1320 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosures herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For firmware and/or software implementations, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not as a limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving first ambient sound information from a mobile device;
    receiving reference ambient sound information from each of a plurality of reference devices, the reference ambient sound information including first reference ambient sound information received from a first reference device of the plurality of reference devices and further including second reference ambient sound information received from a second reference device of the plurality of reference devices;
    determining degrees of similarity, the degrees of similarity including a first degree of similarity between the first ambient sound information and the first reference ambient sound information and further including a second degree of similarity between the first ambient sound information and the second reference ambient sound information; and
    in response to determining that the first degree of similarity is greater than the second degree of similarity, estimating a location of the mobile device based on a location of the first reference device.

2. The method of claim 1, wherein at least one reference device of the plurality of reference devices is a second mobile device.

3. The method of claim 1, wherein the first degree of similarity is determined based on a Euclidean distance between a first vector representing the first ambient sound information and a second vector representing the first reference ambient sound information.

4. The method of claim 1, wherein the location of the mobile device is estimated in response to determining that the first degree of similarity exceeds a first similarity threshold.

5. The method of claim 4, wherein the first similarity threshold is set to be greater as the plurality of reference devices are positioned closer to each other.

6. The method of claim 4, further comprising determining additional degrees of similarity, wherein the location of the mobile device is estimated in response to determining that a number of the additional degrees of similarity greater than a second similarity threshold is less than a count threshold.

7. The method of claim 6, wherein the additional degrees of similarity are determined based on Euclidean distances between vectors representing the reference ambient sound information from pairs of the plurality of reference devices.

8. The method of claim 6, wherein the first similarity threshold is set to be greater as the plurality of reference devices are positioned closer to each other.

9. The method of claim 4, wherein the location of the mobile device is estimated in response to determining that a number of the degrees of similarity greater than the first similarity threshold is less than a count threshold.

10. The method of claim 1, wherein the first ambient sound information comprises a sound signature associated with the mobile device, and wherein the reference ambient sound information from each of the plurality of reference devices comprises a respective reference device sound signature.

11. A server comprising:
a receiver configured to receive first ambient sound information from a mobile device and reference ambient sound information from each of a plurality of reference devices, the reference ambient sound information including first reference ambient sound information received from a first reference device of the plurality of reference devices and further including second reference ambient sound information received from a second reference device of the plurality of reference devices; and
a location determination device configured to estimate a location of the mobile device by determining degrees of similarity, the degrees of similarity including a first degree of similarity between the first ambient sound information and the first reference ambient sound information and further including a second degree of similarity between the first ambient sound information and the second reference ambient sound information,
wherein the location determination device is further configured to estimate the location of the mobile device based on a location of the first reference device in response to determining that the first degree of similarity is greater than the second degree of similarity.

12. The server of claim 11, wherein at least one reference device of the plurality of reference devices is a second mobile device.

13. The server of claim 11, further comprising an information database configured to store information indicating respective locations of the plurality of reference devices.

14. The server of claim 11, wherein the first degree of similarity is determined based on a Euclidean distance between a first vector representing the first ambient sound information and a second vector representing the first reference ambient sound information.

15. The server of claim 11, wherein the location of the mobile device is estimated in response to determining that the first degree of similarity exceeds a first similarity threshold.

16. The server of claim 15, wherein the first similarity threshold is set to be greater as the plurality of reference devices are positioned closer to each other.

17. The server of claim 15, wherein the location determination device is further configured to determine additional degrees of similarity, and wherein the location of the mobile device is estimated in response to determining that a number of the additional degrees of similarity greater than a second similarity threshold is less than a count threshold.

18. The server of claim 17, wherein the additional degrees of similarity are determined based on Euclidean distances between vectors representing the reference ambient sound information from pairs of the plurality of reference devices.

19. The server of claim 17, wherein the first similarity threshold is set to be greater as the plurality of reference devices are positioned closer to each other.

20. The server of claim 15, wherein the location of the mobile device is estimated in response to determining that a number of the degrees of similarity greater than the first similarity threshold is less than a count threshold.

21. The server of claim 11, wherein the first ambient sound information comprises a sound signature associated with the mobile device, and wherein the reference ambient sound information from each of the plurality of reference devices comprises a respective reference device sound signature.

22. A server comprising:
means for receiving first ambient sound information from a mobile device and for receiving reference ambient sound information from each of a plurality of reference devices, the reference ambient sound information including first reference ambient sound information received from a first reference device of the plurality of reference devices and further including second reference ambient sound information received from a second reference device of the plurality of reference devices; and
means for estimating a location of the mobile device by determining degrees of similarity, the degrees of similarity including a first degree of similarity between the first ambient sound information and the first reference ambient sound information and further including a second degree of similarity between the first ambient sound information and the second reference ambient sound information,
wherein the location of the mobile device is estimated based on a location of the first reference device in response to determining that the first degree of similarity is greater than the second degree of similarity.

23. The server of claim 22, wherein at least one reference device of the plurality of reference devices is a second mobile device.

24. The server of claim 22, further comprising means for storing information indicating respective locations of the plurality of reference devices.

25. The server of claim 22, wherein the of first degree of similarity is determined based on a Euclidean distance between a first vector representing the first ambient sound information and a second vector representing the first reference ambient sound information.

26. The server of claim 22, wherein the location of the mobile device is estimated in response to determining that the first degree of similarity exceeds a first similarity threshold.

27. The server of claim 26, wherein the first similarity threshold is set to be greater as the plurality of reference devices are positioned closer to each other.

28. The server of claim 26, wherein the means for estimating the location of the mobile device is configured to determine additional degrees of similarity, and wherein the location of the mobile device is estimated in response to determining that a number of the additional degrees of similarity greater than a second similarity threshold is less than a count threshold.

29. The server of claim 28, wherein the additional degrees of similarity are determined based on Euclidean distances between vectors representing the reference ambient sound information from pairs of the plurality of reference devices.

30. The server of claim 28, wherein the first similarity threshold is set to be greater as the plurality of reference devices are positioned closer to each other.

31. The server of claim 26, wherein the location of the mobile device is estimated in response to determining that a number of the degrees of similarity greater than the first similarity threshold is less than a count threshold.

32. The server of claim 22, wherein the first ambient sound information comprises a sound signature associated with the mobile device, and wherein the reference ambient sound information from each of the plurality of reference devices comprises a respective reference device sound signature.

33. A computer-readable storage medium comprising instructions that, when executed by a processor, cause the processor to:
receive first ambient sound information from a mobile device;
receive reference ambient sound information from each of a plurality of reference devices, the reference ambient sound information including first reference ambient sound information received from a first reference device of the plurality of reference devices and further includes second reference ambient sound information received from a second reference device of the plurality of reference devices;
determine degrees of similarity, the degrees of similarity including a first degree of similarity between the first ambient sound information and the first reference ambient sound information and further including a second degree of similarity between the first ambient sound information and the second reference ambient sound information; and
in response to determining that the first degree of similarity is greater than the second degree of similarity, estimate determining a location of the mobile device based on a location of the first reference device.

34. The computer-readable storage medium of claim 33, wherein at least one reference device of the plurality of reference devices is a second mobile device.

35. The computer-readable storage medium of claim 33, wherein the first degree of similarity is determined based on a Euclidean distance between a first vector representing the first ambient sound information and a second vector representing the first reference ambient sound information.

36. The computer-readable storage medium of claim 33, wherein the location of the mobile device is estimated in response to determining that the first degree of similarity exceeds a first similarity threshold.

37. The computer-readable storage medium of claim 36, wherein the first similarity threshold is based on a relative proximity of the plurality of reference devices.

38. The computer-readable storage medium of claim 36, wherein the instructions are further executable by the processor to determine additional degrees of similarity, wherein the location of the mobile device is estimated in response to determining that a number of the additional degrees of similarity greater than a second similarity threshold is less than a count threshold.

39. The computer-readable storage medium of claim 38, wherein the degrees of second similarity are determined based on Euclidian distances between vectors representing the reference ambient sound information from pairs of the plurality of reference devices.

40. The computer-readable storage medium of claim 38, wherein the first similarity threshold is based on a relative proximity of the plurality of reference devices.

41. The computer-readable storage medium of claim 36, wherein the location of the mobile device is estimated in response to determining that a number of the degrees of similarity greater than the first similarity threshold is less than a count threshold.

42. The computer-readable storage medium of claim 33, wherein the first ambient sound information comprises a sound signature associated with the mobile device, and wherein the reference ambient sound information from each of the plurality of reference devices comprises a respective reference device sound signature.

43. The method of claim 1, wherein the location of the mobile device is estimated based on a location of the second reference device if the second degree of similarity is greater than the first degree of similarity.

44. The server of claim 11, wherein the location determination device is further configured to estimate the location of the mobile device based on a location of the second reference device in response to determining that the second degree of similarity is greater than the first degree of similarity.

45. The server of claim 22, wherein the location of the mobile device is estimated based on a location of the second reference device if the second degree of similarity is greater than the first degree of similarity.

46. The computer-readable storage medium of claim 33, wherein the instructions are further executable by the processor to cause the processor to estimate the location of the mobile device based on a location of the second reference device if the second degree of similarity is greater than the first degree of similarity.

47. A method comprising:
receiving first ambient sound information from a mobile device;
receiving first reference ambient sound information from a first reference device;
receiving second reference ambient sound information from a second reference device;
comparing a first degree of similarity between the first ambient sound information and the first reference ambient sound information to a second degree of similarity between the first ambient sound information and the second reference ambient sound information; and
in response to determining that the first degree of similarity is greater than the second degree of similarity, estimating a location of the mobile device based on a location of the first reference device.

48. The method of claim 47, further comprising determining whether the first degree of similarity exceeds a threshold, wherein the location of the mobile device is estimated in response to determining that the first degree of similarity exceeds the threshold, and wherein the threshold is based on a proximity of the first reference device relative to the second reference device.

49. The method of claim 47, wherein the location of the mobile device is estimated based on a location of the second reference device in response to determining that the second degree of similarity is greater than the first degree of similarity.

* * * * *